United States Patent Office 3,728,233
Patented Apr. 17, 1973

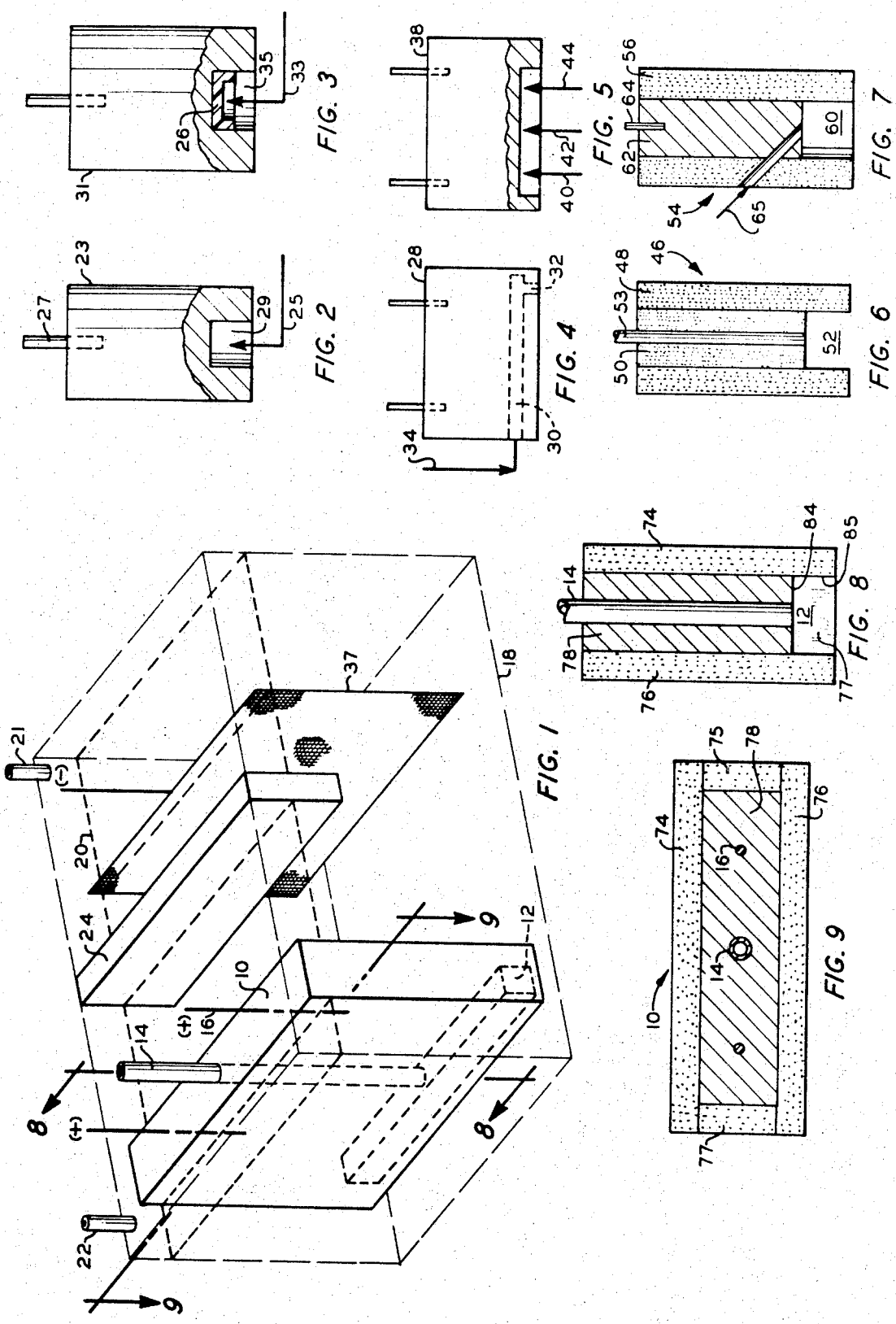

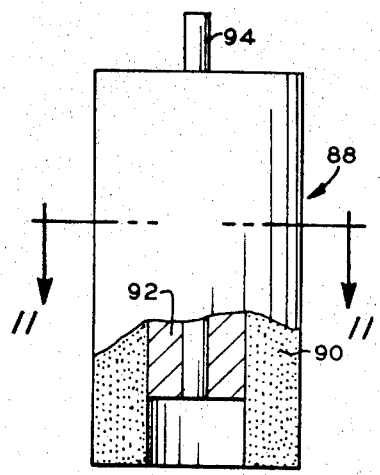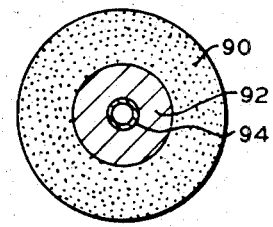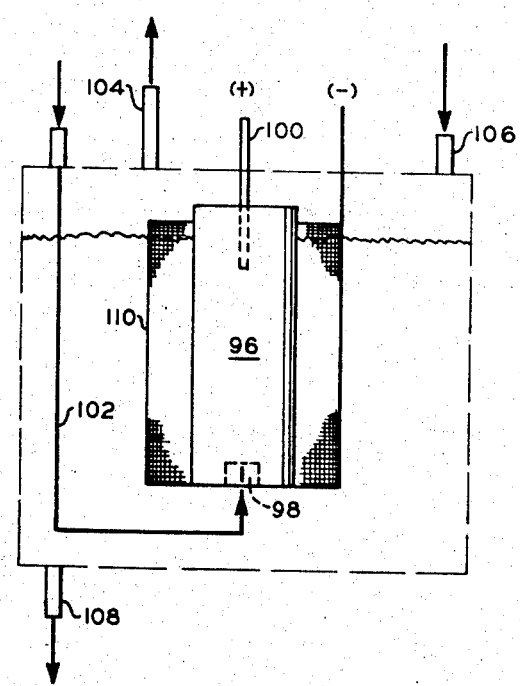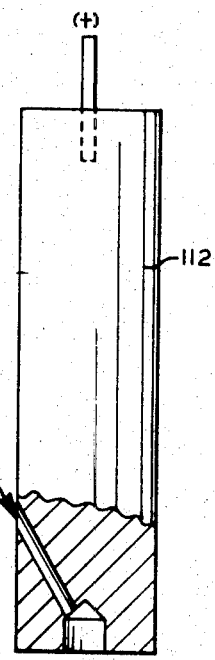
FIG. 10
FIG. 11
FIG. 12
FIG. 13

3,728,233
POROUS ELECTRODE HAVING OPEN
FEED CAVITY
Benedict H. Ashe, Jr., and Homer M. Fox, Bartlesville,
Okla., assignors to Phillips Petroleum Company
Continuation of application Ser. No. 75,293, Sept. 24,
1970, which is a continuation of appplication Ser. No.
739,507, June 24, 1968. This application Feb. 14,
1972, Ser. No. 226,039
Int. Cl. B01k 3/00; C07b 29/06
U.S. Cl. 204—59 R                              17 Claims

ABSTRACT OF THE DISCLOSURE

In an electrochemical process, the reaction takes place within the confines of a porous electrode element. The bottom of this electrode element has a cavity open to the bulk of the electrolyte. The gaseous or vaporous feed materials are introduced into this cavity, and are converted during their upward passage through the electrode without contact with the bulk of the electrolyte.

This application is a continuation of our copending application Ser. No. 75,293, filed Sept. 24, 1970, now abandoned, which in turn was a continuation of our then pending application Ser. No. 739,507, filed June 24, 1968, now abandoned.

BACKGROUND OF THE INVENTION

This invention relates to electrode elements and processes for electrochemical conversion.

Porous electrode elements, particularly porous carbon anodes are widely used in electrochemical conversion reactions. Generally, the utilization of such elements has involved immersing the element in an electrolyte and passing an electric current through this electrolyte from this element to an oppositely charged element. At least a portion of the materials within the electrolyte is converted into products at one or both electrodes. In a variation on this process, an additional feedstock for the conversion process is bubbled into the electrolyte through a porous electrode element, such as a porous carbon anode, to produce still different products.

Very recently it has been discovered that the reaction in an electrochemical conversion operation can be carried out within the confines of the porous electrodes element itself. This type of operation is of particular utility in electrochemical fluorination because it makes possible a simple one-step route to partially fluorinated products which had previously been difficult to obtain. Carrying out the fluorination reaction within the porous anode, in addition to making possible the direct production of partially fluorinated products, also allows operation at high rates of conversion and without the formation of substantial amounts of cleavage products generally produced by the older methods when operating at high conversion rates. The feed to be fluorinated is introduced into the porous anode at a point near its bottom and the fluorinated mixture exits at the top of the anode, generally above the electrolyte level. Passage of the feed into the bulk of the electrolyte is avoided.

It is apparent that if the reaction is to take place within the electrode element, larger electrodes are desirable in order to increase the available surface area wherein the reaction takes place. However with larger electrodes, it has been found that an uneven distribution of feed material results within the electrode.

Nonuniform distribution of the feed material results in a loss of the advantage of this type of operation with respect to the production of only partially fluorinated products; this is because in a system, for instance, utilizing a KF·2HF electrolyte, the fluorinating species are generated continuously throughout the submerged surface of the electrode element and thus, in areas where feed is not distributed properly, the excess of fluorinating species will fluorinate the available feed all the way to perfluoro products, or even produce undesirable cleavage products. Also nonuniform feed distribution can result in sudden contact of accumulated fluorine with accumulated feed material or with hydrogen from the other electrode element to give an explosive reaction. It can thus be seen that uniform distribution of the feed material and, consequently, uniform contact of the feed material with the electrolyte at the point of reaction are of prime importance.

This problem of nonuniform distribution of the feed material can be solved to a large extent by using feed distribution laterals in the lower portion of the electrode element. However, these feed distribution laterals, unless protected in some fashion, can become flooded with electrolyte and become plugged on continued usage.

SUMMARY OF THE INVENTION

It is an object of this invention to provide an improved process and apparatus wherein the reaction in an electrochemical conversion process using a porous electrode element is carried out within the confines of the electrode element;

It is yet a further object of this invention to provide for uniform distribution of feed to a porous electrode element; and It is a further object of this invention to provide a porous electrode element wherein plugging of the feed distribution means is alleviated.

In accordance with this invention a cavity, into which gaseous or vaporous feed materials are introduced, is provided in the bottom of a porous electrode element for an electrochemical conversion process in which the reaction takes place within the confines of the porous element.

BRIEF DESCRIPTION OF THE DRAWINGS

In the drawings, forming a part hereof, in which like reference characters denote like parts in the various views,
FIG. 1 is a schematic representation of an electrochemical cell utilizing an anode having an open cavity in accordance with this invention;
FIG. 2 is a cylindrical electrode in accordance with the instant invention shown partially in section;
FIG. 3 is a partial sectional view of an electrode in accordance with alternative embodiment of the instant invention;
FIG. 4 is a side elevational view of an electrode, in accordance with another embodiment of the instant invention;
FIG. 5 is a view, partially in section, of an electrode element in accordance with another embodiment of the instant invention;
FIGS. 6 to 7 are sectional views of electrode elements in accordance with other embodiments of this invention;
FIG. 8 is a view along section lines 8—8 of FIG. 1;
FIG. 9 is a view along section lines 9—9 of FIG. 1;
FIG. 10 is a side elevational view, partially in section, of another preferred embodiment of the invention;
FIG. 11 is a view along section lines 11—11 of FIG. 10;
FIG. 12 is a schematic representation of an electrochemical cell in accordance with another alternative embodiment of the invention; and
FIG. 13 is a view, partially in section, of an electrode element in accordance with yet another alternate embodiment of the invention.

DESCRIPTION OF THE PREFERRED EMBODIMENTS

The size and shape of the cavity will vary depending on the size and shape of the electrode element. With a cylindrical electrode a hole can simply be drilled part way into the bottom of the electrode. With a slab-type electrode the cavity can take the form of an elongated channel or recessed portion in the bottom of the electrode. The cavity can even take the form of a feed distribution lateral drilled into one side of a slab-type electrode parallel to the bottom of the electrode provided that the lateral is in open communication with the electrolyte at one or more locations below the level of the lateral.

Generally the cavity as shown, for instance, in FIG. 8 will extend upward from the lowermost extension or bottom of the porous outer section a distance equal to between $\frac{1}{100}$ and $\frac{1}{4}$ of the total height of the porous electrode element, and represents a volume equal to $\frac{1}{100}$ to $\frac{95}{100}$ of the volume of that portion of the electrode element containing the cavity.

It is genuinely remarkable to discover that it is possible to solve the problem of electrolyte flooding of feed entry ports and/or feed distribution laterals by maintaining the feed distribution area in open contact with the bulk of the electrolyte. However, surprisingly, when the bulk of the electrolyte is in open communication with the cavity into which the feed is introduced, the pores and/or distribution laterals are not plugged, perhaps because of the freedom of the electrolyte to circulate which prevents it from being confined under pressure of the feeding system.

The electrolyte is nonwetting to the electrode; therefore the feed materials are far more compatible with the surface of the electrode element than is the electrolyte and, apparently for this reason, are very rapidly absorbed into the porous electrode element. Nonwetting electrolyte-electrode combinations can be obtained simply by a suitable choice of these cell components. For example, the metal fluoride-containing HF electrolytes commonly used in fluorine generation or in electrochemical fluorination are nonwetting to carbon electrodes. If an electrode material is wetted by an electrolyte, it can be conventionally treated with a wet-proofing agent.

The porous electrode element can comprise any porous electrode material suitable for electrochemical conversion reactions taking place within the confines of the pores of that electrode material. It can, for example, consist of a single piece of uniformly porous carbon. It can have a varying porosity with smaller pores at the bottom and larger pores at the top so as to enable deeper immersion into the electrolyte. It can have varying porosity from outside to inside, with smaller pores in the core section and larger pores on the outside in contact with the electrolyte. It can also be a two-section "sandwich" electrode element having large pores in the outer section surrounding a central core, the large pores being in contact with the electrolyte, and the core being comprised of an impermeable current conductive material such as nonporous carbon or metal.

The optimum surface to volume ratio of the reaction section will depend upon a number of factors among which are the desired degree of conversion and the depth of the electrode immersion. For example, in the electrochemical fluorination of a feedstock such as ethylene dichloride, a surface to volume ratio of about 2 in.$^{-1}$ is satisfactory when the electrode immersion is about 12 inches and the hydrogen conversion is about 50 percent. Ordinarily, surface to volume ratios from about 1 to about 3 in.$^{-1}$ are used but, as mentioned above, this is dependent upon other conditions, and ratios above and below this range can frequently be used. For example, surface to volume ratios of up to about 10 in.$^{-1}$ can be used with some combination of conditions which include very shallow electrode immersions. The surface to volume ratio is computed as the electrogeometric surface, in square inches, of the reaction section divided by the volume, in cubic inches, of the reaction section. The electrogeometric surface is the area of the geometric envelope of that portion of the more porous section that is below the electrolyte level and in contact with the bulk of the electrolyte. The volume of the reaction section is simply the geometric volume which is below the electrolyte level and exclusive of the volume of the core components.

In the electrode comprised of a porous material such as carbon having a relatively uniform pore size throughout the electrode, the average pore diameter will generally be in the range of 1 to 150 microns, preferably between 40 and 140, and still more preferably between 50 and 120, microns. These values depend somewhat on the depth of immersion of the electrode with deeper immersions requiring somewhat smaller pores. Generally the permeability of such porous materials will be in the range of 0.5 to 75 darcys, preferably from about 5 to about 75, and still more preferably from about 10 to about 70, darcys. In general the total porosity will be in the range of about 15 to about 60 percent.

The feed is discharged into the cavity as a gas or liquid where it is absorbed into the porous electrode element. If the feed is liquid its boiling point should be less than the temperature of the electrode and/or electrolyte. It is to be noted that the temperature of the electrode may be substantially higher than that of the electrolyte. While it is not desired to limit the invention to any theory of operation, it is believed that the electrolyte partially penetrates the electrode through some of the larger pores. The feed material distributes itself throughout the porous electrode and migrates to near the outer surface to form a three-phase boundary of feed, electrolyte, and electrode element, at which point the reaction takes places. The product and unreacted feed then migrate up to the portion of the electrode element above the electrolyte level where they are collected, without ever having broken out into the bulk of the electrolyte. (The feed may be momentarily in contact with the bulk of the electrolyte when it is introduced into the cavity.) In some instances the feed can momentarily be in contact with the bulk of the electrolyte when it is introduced into the cavity.

The porous portions of the porous elements of the electrode assemblies of the invention can be fabricated from any suitable conducting porous electrolyte resistant material which is compatible with the system, e.g., nickel, iron, various metal alloys, in addition to carbon, which is not wetted by the electrolyte. By "not wetted" is meant that the contact angle between the electrolyte and the electrode must exceed 90° in order that capillary forces will prevent substantial invasion of the small pores of the porous element by the electrolyte. Porous carbon, which is economical and readily available in ordinary channels of commerce, is presently preferred for said porous element. In many instances it is advantageous to provide a metal element in contact with the porous carbon element. For instance a porous carbon anode can have a nickel screen wrapped around it. Various grades of porous carbon can be used in the practice of the invention. It is preferred to employ porous carbon which has been made from carbon produced by pyrolysis, but not graphitic carbon. The electrodes of the invention can be fabricated in any suitable shape or design, but must be arranged or provided with a suitable means for introducing the feed reactant material into the feed cavity and then into the pores of the porous element thereof.

The electrode assemblies of the invention can be employed in any convenient cell configuration or electrode arrangement. The only requirements are that the cell body and the electrodes in the cell be fabricated of materials which are resistant to the action of the contents of the cell under the reaction conditions. Materials such as steel, iron, nickel, polytetrafluoroethylene (Teflon), carbon, and the like, can frequently be employed for the cell body. When a nonporous cathode or a nonporous anode is employed which is not fabricated in accordance with this invention (along with a porous anode or a porous cathode of the invention), said nonporous cathode or nonporous anode can be fabricated in any suitable shape or design and can be made of any suitable conducting material such as iron, steel, nickel, alloys of said metals, carbon and the like. For example, said nonporous cathode can be fabricated from a metal screen or gauze, a perforated plate, and can have a shape complementary to the shape of the porous anode.

The electrode assemblies of the invention can be employed in a wide variety of electrochemical conversion processes in which the porous electrode is not wetted by the particular electrolyte being used and wherein the reaction takes place within the confines of the electrode. Some examples of such processes are electrochemical halogenation, electrochemical cyanation, and cathodic conversions such as the reduction of alcohols to hydrocarbons or the reduction of acids to alcohols. One electrochemical conversion process in which the electrode assemblies of the invention are particularly valuable is the electrochemical fluorination of fluorinatable materials in the presence of an essentially anhydrous liquid hydrogen fluoride-containing electrolyte. Thus, for purposes of convenience, and not by way of limitation, the electrode assemblies of the invention are primarily described in terms of being employed as an anode in the electrochemical fluoriation of fluorinatable materials when using said hydrogen fluoride-containing electrolyte.

As referred to hereinabove, the instant invention is applicable to electrochemical conversion reactions wherein a current-conducting essentially anhydrous liquid hydrogen fluoride electrolyte is electrolyzed in an electrolysis cell provided with a cathode and a porous anode (preferably porous carbon), a fluorinatable organic compound is introduced into the pores of said anode and therein at least a portion of said organic compound is at least partially fluorinated within the pores of said anode, and fluorinated compound products are recovered from said cell. The present invention provides improved electrode assemblies which are especially suited to be employed as anodes in processes to produce partially fluorinated materials and/or to fluorinate organic compounds with little or no scission of carbon to carbon bonds.

Very few organic compounds are resistant to fluorination. Consequently, a wide variety of feed materials, both normally liquid and normally gaseous compounds, can be used as feedstocks in this process. Organic compounds which are normally gaseous or which can be introduced in gaseous state into the pores of a porous anode under the conditions employed in the electrolysis cell, and which are capable of reacting with fluorine, are presently preferred as starting materials. However, starting materials which are introduced into the pores of the anode in liquid state can also be used. Generally speaking, desirable organic starting materials which can be used are those containing from 1 to 8, preferably 1 to 6, carbon atoms per molecule. However, reactants which contain more than 8 carbon atoms can also be used. If desired, suitable feed materials having boiling points above cell operating temperatures can be passed into the pores of the porous anode in gaseous state by utilizing a suitable carrier gas. Thus, a suitable carrier gas can be saturated with the feed reactant (as by bubbling said carrier gas through the liquid reactant), and then passing the saturated carrier gas into the pores of the porous anode. Suitable carrier gases include the inert gases such as helium, argon, krypton, neon, xenon, nitrogen, etc. Normally gaseous materials such as hydrocarbons containing from 1 to 4 carbon atoms can also be used as carrier gases. These latter gases will react, but in many instances this will not be objectionable. The above-described carrier gases, and particularly said inert gases, can also be used as diluents for the feedstocks which are normally gaseous at cell operating conditions.

Some general types of starting materials which can be used include, among others, the following: alkanes, alkenes, alkynes, amines, ethers, esters, mercaptans, nitriles, alcohols, aromatic compounds, and partially halogenated compounds of both the aliphatic and aromatic series. It will be understood that the above-named types of compounds can be either straight chain, branched chain, or cyclic compounds. Partially chlorinated and the partially fluorinated compounds are the preferred partially halogenated compounds.

Since fluorine is so reactive, no list of practical length could include all starting materials which can be used. However, representative examples of the above-described starting materials include, among others, the following: methane; ethane; propane; butane; isobutane; pentane; n-hexane; n-octane; cyclopropane; cyclopentane; cyclohexane; cyclooctane; 1,2-dichloroethane; 1-fluoro-2-chloro-3-methylheptane; ethylene; propylene; cyclobutene; cyclohexene; 2-methylpentene-1; 2,3-dimethylhexene-2; butadiene; vinyl chloride; 3-fluoropropylene; acetylene; methylacetylene; vinylacetylene; 4,4-dimethylpentyne-2; allyl chloride; methylamine; ethylamine; diethylamine; 2-amino-3-ethylpentane; 3 - bromopropylamine; triethylamine; dimethyl ether; diethyl ether; methyl ethyl ether; methyl vinyl ether; 2-iodoethyl methyl ether; di-n-propyl ether; methyl formate; methyl acetate; ethyl butyrate; ethyl formate; n-amyl acetate; methyl 2-chloroacetate; methyl mercaptan; ethyl mercaptan; n-propyl mercaptan; 2-mercaptohexane; 2-methyl-3-mercaptoheptane; acetonitrile; propionitrile; n-butyronitrile; acrylonitrile; n-hexanonitrile; methanol; ethanol; isopropanol; n-hexanol; 2,2-dimethylhexanol-3; n-butanol; ethylenebromohydrin; benzene; toluene; cumene; o-xylene; p-xylene; and monochlorobenzene.

In addition to such fluorinatable organic materials described above, carbon monoxide and oxygen can be used as feedstocks to provide carbonyl fluoride and oxygen difluoride respectively.

The electrochemical fluorination process is carried out in a medium of hydrogen fluoride electrolyte. Although said hydrogen fluoride electrolyte can contain small amounts of water, such as up to about 5 weight percent, it is preferred that said electrolyte be essentially anhydrous. The hydrogen fluoride electrolyte is consumed in the reaction and must be either continuously or intermittently replaced in the cell.

Pure anhydrous liquid hydrogen fluoride is nonconductive. The essentially anhydrous liquid hydrogen fluoride described above has a low conductivity which, generally speaking, is lower than desired for practical operation. To provide adequate conductivity in the electrolyte, and to reduce the hydrogen fluoride vapor pressure at cell operating conditions, an inorganic additive can be incorporated in the electrolyte. Examples of suitable additives are inorganic compounds which are soluble in liquid hydrogen fluoride and provide effective electrolytic conductivity. The presently preferred additives are the alkali metal (sodium, potassium, lithium, rubidium, and cesium) fluorides and ammonium fluoride. Other additives which can be employed are sulfuric acid and phosphoric acid. Potassium fluoride, cesium fluoride, and rubidium fluoride are the presently preferred additives. Potassium fluoride is the presently most preferred additive. Said additives can be utilized in any suitable molar ratio of additive to hydrogen fluoride within the range of from 1:4.5 to 1:1, preferably 1:4 to 1:2. The presently most preferred electrolytes are those which correspond approximately to the formulas $KF \cdot 2HF$, $KF \cdot 3HF$, or $KF \cdot 4HF$. Such electrolytes can be conveniently prepared by adding the required quantity of hydrogen fluoride to $KF \cdot HF$ (potassium bifluoride). In general, said additives are not consumed in the process and can be used indefinitely. Said additives are frequently referred to as conductivity additives for convenience.

The electrochemical fluorination can be effectively and conveniently carried out over a broad range of temperatures and pressures limited only by the freezing point and the vapor pressure of the electrolyte. Generally speaking, the fluorination process can be carried out at temperatures within the range of from minus 80 to 500° C. at which the vapor pressure of the electrolyte is not excessive, e.g., less than 250 mm. Hg. It is preferred to operate at temperatures such that the vapor pressure of the electrolyte is less than about 50 mm. Hg. As will be understood by those skilled in the art, the vapor pressure of the electrolyte at a given temperature will be dependent upon the composition of said electrolyte. It is well known that additives such as potassium fluoride cause the vapor pressure of liquid hydrogen fluoride to be decreased an unusually great amount. A presently preferred range of temperature is from about 60 to about 105° C. Higher temperatures sometimes tend to promote fragmentation of the product molecules.

Pressures substantially above or below atmospheric can be employed if desired, depending upon the vapor pressure of the electrolyte as discussed above. In all instances, the cell pressure will be sufficient to maintain the electrolyte in liquid phase. Generally speaking, the process is conveniently carried out at substantially atmospheric pressure. It should be pointed out that a valuable feature of the process is that the operating conditions of temperature and pressure within the limitations discussed above are not critical and are essentially independent of the type of feed employed in the process.

For purposes of efficiency and economy, the rate of direct current flow through the cell is maintained at a rate which will give the highest practical current densities for the electrodes employed. Generally speaking, the current density will be high enough so that anodes of moderate size can be employed, yet low enough so that the anode is not corroded or disintegrated under the given current flow. Current densities within the range of from 30 to 1000, or more, preferably 50 to 500 milliamps per square centimeter of anode geometric surface area can be used. Current densities less than 30 milliamps per square centimeter of anode geometric surface area are not practical because the rate of fluorination is too slow. The voltage which is employed will vary depending upon the particular cell configuration employed and the current density employed. In all cases, under normal operating conditions, however, the cell voltage or potential will be less than that required to evolve or generate free or elemental fluorine. Voltages in the range of from 4 to 12 volts are typical. The maximum voltage will not exceed 20 volts per unit cell. Thus, as a guide, voltages in the range of 4 to 20 volts per unit cell can be used.

As used herein unless otherwise specified, the term "anode geometric surface" refers to the outer geometric surface area of the porous carbon element of the anode which is exposed to electrolyte and does not include the pore surfaces of said porous element.

The feed rate of the fluorinatable material being introduced into the pores of the porous carbon element of the anode is an important process variable in that, for a given current flow or current density, the feed rate controls the degree of conversion. Similarly, for a given feed rate, the amount of current flow or current density can be employed to control the degree of conversion. Gaseous feed rates which can be employed will preferably be in the range of from 0.5 to 10 milliliters per minute per square centimeter of anode geometric surface area. With the higher feed rates, higher current density and current rates are employed. Since the anode can have a wide variety of geometrical shapes, which will affect the geometrical surface area, a sometimes more useful way of expressing the feed rate is in terms of anode cross-sectional area (taken perpendicular to the direction of flow). On this basis, for a typical anode, the above range would be 25 to 500 milliliters per minute per square centimeter of cross-sectional area.

The actual feed rate employed will depend upon the type of carbon used in fabricating the porous element of the anode as well as several other factors including the nature of the feedstock, the conversion desired, current density, etc., because all these factors are interrelated and a change in one will affect the others. The feed rate will be such that essentially none of the feed, after having been absorbed, leaves the anode to form bubbles which escape into the main body of the electrolyte. Essentially all of the feedstock and/or reaction product travels within the carbon anode via the pores therein until it reaches a collection zone within the anode from which it is removed via a conduit, or until it exits from the anode at a point above the surface of the electrolyte.

The more permeable carbons will permit higher flow rates than the less permeable carbons. Similarly, electrode shapes, electrode dimensions, and manner of disposition of the electrode in the electrolyte will also have a bearing on the flow rate. Thus, owing to the many different types of carbon which can be employed and the almost infinite number of combinations of electrode shapes, dimensions, and methods of disposition of the electrode in the electrolyte, there are no really fixed numerical limits on the flow rates which can be used. Broadly speaking, the upper limit on the flow rate will be that beyond which the feedstock begins to escape into the bulk of the electrolyte. Broadly speaking, the lower limit of the feed rate will be determined by the requirement to supply the minimum amount of feedstock sufficient to prevent evolution of free fluorine. As a practical guide to those skilled in the art, the gaseous flow rates can be within the range of from 3 to 600, preferably 12 to 240 cc. (STP) per minute per square centimeter of cross-sectional area (taken perpendicular to the direction of flow). With large electrodes, particularly elongated rectangular electrodes, care should be taken to obtain reasonably uniform feed distribution throughout the feed cavity. The instant invention provides a simple means of obtaining exceptional uniformity in feed distribution.

Although the electrolyte is nonwetting, there will be some penetration of the larger pores of the electrode element by the hydrogen fluoride electrolyte as previously noted. The amount of said penetration will depend upon the pore size and other factors. The larger size pores are more readily penetrated. It has been found that porous carbon anodes as described herein can be successfully operated when up to about 40 or 50 percent of the pores have been filled by liquid HF electrolyte.

The feed material and the products obtained therefrom are retained in the cell for a period of time which is generally less than on minute. Because the residence time is comparatively short and is especially uniform, the production of the desired products is facilitated. The fluorinated products and the unconverted feed are passed from the cell and then are subjected to conventional separation techniques such as fractionation, solvent extraction, adsorption, and the like, for separation of unconverted feed and reaction products. Uncovered or insufficiently converted feed materials can be recycled to the cell for the production of more highly fluorinated products, if desired. Perfluorinated products, or other products which have been too highly fluorinated, can be burned to recover hydrogen fluoride which can be returned to the cell, if desired. By-product hydrogen, produced at the cathode, can be burned to provide heat energy or can be utilized in hydrogen-consuming processes such as hydrogenation, etc.

Referring now to the drawings, particularly FIG. 1, there is shown in schematic representation a complete electrochemical conversion cell having a porous electrode element 10 of a generally rectangular shape. In the bottom of porous anode 10 is cavity 12. Feed is introduced into cavity 12 by a feed introduction line 14 which serves as a first conduit means for introducing feed. Current collectors 16 are embedded in the upper portion of porous electrode element 10. Said porous element 10 is disposed in cell container 18. The upper end of said porous electrode element is above the level of the electrolyte in said container as depicted by reference character 20. Thus, the upper end surface of porous electrode element 10 comprises a second surface for withdrawing unreacted feedstock and product from the pores of the porous electrode element 10, the interior wall of cavity 12 comprising a first surface for the introduction of feed material into the pores of said porous element 10. Conduit 22 comprises a second conduit means for withdrawing product and unreacted feedstock from within the pores of porous electrode element 10. Cathode 37 is shown in the form of a metal screen. If desired, the space above the electrolyte can be divided by a partion 24 extending from the top of the cell to below the level of the electrolyte to keep the anode products separated from the cathode products; or, a conventional cell divider can be employed to divide the cell into an anode compartment and a cathode compartment. However, such a divider is not essential Cathode products can be removed via conduit 21.

FIG. 2 shows a porous cylindrical electrode element 23 with a portion broken away to better show cavity section 29. Feed is introduced via line 25. Current collector 27 is embedded in the top.

In FIG. 3 electrode element 31 is shown having a Telflon insert 26 in the upper portion of the cavity. The impermeable Teflon insert 26 makes possible the provision of a gas cap around the end of first conduit 33 as it discharges the feedstock into cavity 35. While a gas cap can be provided without the use of such an insert, the absorption of the feed materials into the pores can be so remarkably rapid that feed introduction rates in excess of what are generally practical are necessary in order to provide a gas cap without the use of such an insert.

In FIG. 4 there is shown an alternative embodiment of the invention wherein a porous electrode element 28 is in the form of a rectangular slab. A feed introduction lateral 30 is shown drilled through the lower portion of this electrode element just above the bottom of the element and substantially parallel to the bottom of the element, terminating just short of the opposite end of said element. At this opposite end of the electrode element, a drain hole 32 connects with lateral 30 in the bottom of element 28. Feed is introduced into lateral 30 via line 34. Electrolyte which invades lateral 30 circulates out into the bulk of the electrolyte through drain hole 32. The portion of the cavity in open communication with the bulk of the electrolyte is in the bottom of the electrode element.

In FIG. 5 there is shown an alternative embodiment of the invention wherein the cavity is in the form of an elongated recess 36 in the bottom of electrode element 38. Multiple feed introduction means 40, 42 and 44 are shown.

FIG. 6 depicts another alternative embodiment of the instant invention wherein rectangular porous electrode element 46 has an outer section 48 comprising relatively high porosity carbon and an inner core section 50 comprising relatively low porosity carbon in which open end cavity or recess 52 is formed. Feed introduction line 53 comes into cavity 52 from the top.

FIG. 7 is a cross-sectional view of another alternative embodiment of this invention wherein the cylindrical porous electrode element 54 comprises an outer relatively porous carbon section 56 and an impervious core section 62 in which current collector 64 is embedded. Feed introduction line 65 comes into cavity 60 at an angle from the side.

FIGS. 8 and 9 show cross sections of the anode of FIG. 1 which is the most preferred embodiment of the instant invention. Referring to these figures, there is shown a rectangular slab-shaped electrode element 10 having outer sections 74, 75, 76, and 77 of porous carbon. Between porous section 74 and 76 is impervious core 78. Core 78 can be made of any conductive impervious material which is resistant to the materials in the cell. Carbon, graphite, or metal, for instance, can be used. In the bottom of electrode element 10 is cavity 12. Feed introduction line 14 is centrally disposed through core 78. Feed is introduced through feed introduction line 14. The feed, on being introduced into cavity 12, which is in direct communication with the bulk of the electrolyte, flows laterally along bottom surface 84 on the underside of core 78 so as to be distributed evenly along the length of the electrode element. It then flows into the pores of porous sections 74 and 76. Current collectors 16 are embedded in the upper portion of impervious core 78. Cavity 12 can be seen as being defined by the bottom surface 84 of core 78 and the inner surfaces 85 of the extended portions of sections 74, 75, 76, and 77. It is to be noted that sections 74 and 76 extend below core 78 along the sides and that sections 75 and 77 extend below core 78 at the ends to form a cavity 12 open to the bulk of the electrolyte at the bottom and closed on the other five sides. The outer higher pore size sections 75 and 77 can terminate at a point even with the core in alternative embodiments to give a trough-shaped cavity open at each end.

Referring now to FIGS. 10 and 11 there is shown a cylindrical electrode element 88, having an outer porous section 90 and an inner impervious core section 92. Disposed centrally within core section 92 is combination feed introduction line and current collector 94. Impervious core 92 is generally made of impermeable carbon and feed introduction line and current collector 94 is generally made of metal, although any impervious conductive material which is resistant to the materials of the cell can be utilized.

FIG. 12 shows a cell arrangement similar to that of FIG. 1 with a cylindrical anode 96 having a cavity 98 and current collector 100. Feed is introduced into cavity 98 via line 102. Mixed anode and cathode product is withdrawn via conduit 104. Electrolyte is added via conduit 106 and can be withdrawn via conduit 108 although 108 is normally closed. Cathode 110 surrounds anode 96.

FIG. 13 is a view of an electrode element similar to that of FIG. 7 except the entire element 112 is composed of carbon having a substantially uniform porosity.

As used throughout the specification and claims, the term "core" refers to a central section, either a cylinder surrounded on all sides (but not necessarily at the top and bottom) by a porous material, for instance, as shown by FIG. 11, or else a slab surrounded on at least both flat sides (and preferably, but not necessarily the ends) by a porous material, for instance as shown in FIG. 9. This core can be nonporous, of relatively low porosity, or a combination or nonporous and relatively low porosity sections.

Many conventional parts such as temperature controllers, flow regulators, electrical circuitry, and the like have not been included for the sake of simplicity; however, their inclusion is understood by those skilled in the art and it is within the scope of the invention. Similarly, the schematic representations show relative dimensions which may or may not be optimum for specific situations. For example, the distance between anode and cathode can be much smaller than what is illustrated.

EXAMPLE I

The invention was tested with a cylindrical porous carbon anode which was used for the conversion of ethylene dichloride to dichlorotetrafluoroethane (Freon 114) and other fluorinated materials. The porous carbon anode (fabricated from National Carbon 45, having an average pore size of about 55 microns, a permeability of about 20 darcys, and a total porosity of about 50%) was a cylinder measuring 14 x 1⅜ inches. A ¾-inch diameter hole was drilled axially into the bottom of the electrode to provide a cavity ¾-inch deep. Another concentric ¼-inch diameter hole was drilled ¼-inch deep to expand the cavity.

The above-described electrode was used as an anode in an electro-chemical conversion cell which contained KF·2HF as the electrolyte maintained at about 93° C., a circular iron cathode, and an ethylene chloride feed tube which consisted of 3/16-inch copper tubing encased in 1/4-inch Teflon tubing. This tubing extended to the bottom of the electrode and fed the ethylene dichloride directly into the electrode cavity. The anode was submerged 12 inches in the electrolyte and, during operation, the fluorinated products and unconverted feed material exited the electrode through the portion of the porous carbon above the surface of the electrolyte. Hydrogen was evolved at the cathode. A copper pin was inserted into the top of the anode as a current collector. The anode, thus, was similar to that of FIG. 12.

The above-described cell and fluorination process operated satisfactorily for about 8 days; the anode was still operating satisfactorily when the run was terminated. Typical conditions of operation are the following which were observed on the seventh day of operation:

| | |
|---|---|
| Ethylene dichloride conversion _____percent__ | 41 |
| Feed rate _____moles/hr__ | 1.43 |
| Faradays/hr. _____ | 2.22 |
| Moles product/hr. _____ | 0.592 |
| Faradays/mole _____ | 1.55 |
| Current density _____ma./cm.$^2$__ | 178 |
| By-products [1] _____percent__ | 13.8 |

[1] Products other than Freon 114 or convertible to Freon 114 on recycle.

The above-described test shows that the anode arrangement of the present invention is capable of operating continuously in a satisfactory manner with freedom from problems associated with the accumulation of electrolyte in the feed cavity. In a similar run, a control run, in which the feed tube was attached through a Teflon connection tightly fitted to the bottom of the anode thus providing a cavity which was not open to the electrolyte, the anode pressure rose steadily and the cell was shut down by automatic control after 35 hours of operation because of the excessive pressure required to pass ethylene dichloride into the anode.

An indication of the cause of excessive pressure build-up in the control run is shown by the following test. A 1 x 1 x 6 1/4 inch slab of National Carbon 45 porous material was drilled with a 1/4-inch hole near the bottom end thereof, and parallel to the bottom, to within 1/2 inch of its end. A Teflon-covered length of copper tubing was fitted into the open end of the hole and acted as the current controller. KF·2HF was used as the electrolyte and was maintained at about 93° C. The bottom of the anode was immersed at a depth of 12 inches from the surface of the electrolyte. For a 24-hour period, a voltage of about 5.5 volts was applied to the anode and no feed material was passed through the anode. The voltage was insufficient to evolve free fluorine but was, nevertheless, considered to be satisfactory for the validity of an electrolyte migration test. At the completion of the test the anode was removed and sawed in half. It was found to contain a large quantity of electrolye in its cavity.

These data show that, surprisingly, the problem of electrolyte invasion and/or plugging of the feed distribution channels can be alleviated by the most unlikely expedient of maintaining the feed introduction cavity in open communication with the bulk of the electrolyte.

EXAMPLE II

In a test largely similar to that described above, another anode configuration of the present invention was used for the electrochemical fluorination of ethylene dichloride. In this test, using a similar 14 x 1 3/8-inch porous carbon anode (prepared from National Carbon 45 porous carbon material), a 31/64-inch hole was drilled 2 inches into the bottom of the electrode to provide the cavity which was open to the electrolyte. A Teflon liner, about 1/16 inch in thickness, was used to line the upper 7/8-inch portion of the cavity. The anode, thus, was similar to that of FIG. 3.

This electrode was also operated satisfactorily in the fluorination of ethylene dichloride for about 3 days under conditions similar to those described in Example I above. It was shut down only because of an unrelated malfunction.

This example shows that the present invention is also operable with the use of a partial liner within the upper portion of the cavity which results in operation with a gas cap within the anode.

While this invention has been described in detail for the purpose of illustration it is not to be construed as limited thereby but is intended to cover all changes and modifications within the spirit and the scope thereof.

We claim:

1. A process for the electrochemical conversion of a feedstock, which process comprises: passing an electric current through a current-conducting electrolyte composition contained in an electrolysis cell provided with a first electrode element and a porous second electrode element which porous electrode element is not wetted by said electrolyte; releasing said feedstock into said electrolyte at a point within a cavity formed in the bottom portion of said porous electrode element, said cavity being in direct communication with the bulk of said electrolyte; thereafter absorbing said feedstock from said cavity into the pores of said porous electrode element; distributing said feedstock through said porous electrode element and therein at least partially reacting at least a portion of said feedstock; and recovering product and any remaining unreacted feedstock from within said pores of said porous electrode element at a point spaced way from said cavity.

2. A process according to claim 1 wherein said first electrode element is an anode and said porous second electrode element is a cathode.

3. A process according to claim 2 wherein said cathode comprises porous carbon.

4. A process according to claim 3 wherein said porous carbon has an average pore diameter within the range of from 40 to 140 microns.

5. A process according to claim 1 wherein:
the top and a portion of the upper side walls of said cavity are sufficiently impermeable to allow the formation of a gas cap in the upper portion of said cavity;
said gas cap is formed; and
thereafter said feedstock is absorbed from said cavity into the pores of said porous electrode element.

6. A process according to claim 5 wherein said gas cap is caused to form by providing a plastic insert in said cavity to cover said top and portion of said upper side walls of said cavity.

7. A process according to claim 6 wherein said first electrode element is an anode and said porous second electrode element is a cathode.

8. A process according to claim 7 wherein said cathode comprises porous carbon.

9. A process for the electrochemical conversion of an organic compound feedstock, which process comprises: passing an electric current through a current-conducting electrolyte composition contained in an electrolysis cell provided with a cathode and a porous anode which porous anode is not wetted by said electrolyte; releasing said feedstock into said electrolyte at a point within a cavity formed in the bottom portion of said porous anode, said cavity being in direct communication with the bulk of said electrolyte; thereafter absorbing said feedstock from said cavity into the pores of said porous anode; distributing said feedstock through said porous anode and therein at least partially reacting at least a portion of said feedstock; and recovering product and any remaining unreacted feedstock from within said pores of said anode at a point spaced away from said cavity.

10. A process according to claim 9 wherein said electrolyte composition comprises essentially anhydrous liquid hydrogen fluoride, and wherein said product is at least partially fluorinated.

11. A process according to claim 10 wherein said anode comprises porous carbon.

12. A process according to claim 11 wherein said porous carbon has an average pore diameter within the range of from 40 to 140 microns.

13. A process according to claim 9 wherein said electrolyte is circulated between said cavity and said bulk of said electrolyte.

14. A process according to claim 9 wherein:
the top and a portion of the upper side walls of said cavity are sufficiently impermeable to allow the formation of a gas cap in the upper portion of said cavity;
said gas cap is formed; and
thereafter said feedstock is absorbed from said cavity into the pores of said porous electrode element.

15. A process according to claim 14 wherein said gas cap is caused to form by providing a plastic insert in said cavity to cover said top and portion of said upper side walls of said cavity.

16. A process according to claim 15 wherein said electrolyte composition comprises essentially anhydrous liquid hydrogen fluoride, and wherein said product is at least partially fluorinated.

17. A process according to claim 16 wherein said anode comprises porous carbon.

References Cited
UNITED STATES PATENTS

| | | | |
|---|---|---|---|
| 2,592,144 | 4/1952 | Howell et al. | 204—247 |
| 3,280,014 | 10/1966 | Kordesch et al. | 204—74 |
| 3,461,050 | 8/1969 | Childs | 204—59 |

F. C. EDMUNDSON, Primary Examiner

U.S. Cl. X.R.
204—72, 247, 275